United States Patent Office 2,913,488
Patented Nov. 17, 1959

2,913,488

PROCESS FOR THE PRODUCTION OF AROMATIC CARBOXYLIC ACIDS WHICH MAY BE SUBSTITUTED BY SULFONIC ACID GROUPS

Bruno Blaser, Dusseldorf-Urdenbach, Werner Stein, Dusseldorf-Holthausen, and Hartwig Schütt, Dusseldorf-Benrath, Germany, assignors to Henkel & Cie. G.m.b.H., Dusseldorf-Holthausen, Germany, a corporation of Germany No Drawing. Application July 2, 1957
Serial No. 669,429

Claims priority, application Germany July 2, 1956

12 Claims. (Cl. 260—507)

This invention relates to a process for the rearrangement of acid radicals on aromatic nuclei whereby a product is obtained having the acid radicals oriented differently with respect to one another than the acid radicals on the starting material. It more specifically relates to a treatment of aromatic sulfonic acids to cause a rearrangement of the sulfonic acid radicals on the aromatic nuclei in the para-position. Carboxylic acids of the same type are also produced during the reaction.

It is an object of this invention to provide a rearrangement reaction for the production of aromatic sulfonic acids by heating salts of aromatic sulfonic acids having the sulfonic acid groups in one position on the aromatic nucleus to cause a rearrangement of the relative position of said sulfonic acid groups to a different position of acid groups on said aromatic nucleus.

It is a further object of this invention to provide a process for producing aromatic dicarboxylic acids by heating salts of aromatic sulfonic acids.

These and other objects of this invention will become apparent as the description thereof proceeds.

We have found that salts of aromatic carboxylic acids, especially dicarboxylic acids, may be obtained by heating salts of aromatic sulfonic acids in the presence of carbon dioxide, which may also be present in combined form, and in the presence of acid-binding compounds to temperatures above 200° C. For example, in accordance with the novel process herein described salts of terephthalic acid may be produced from salts of benzene monosulfonic acid. Depending on the reaction conditions, varying amounts of salts of p-sulfonic benzoic acid are formed as side products. Under certain reaction conditions, salts of aromatic carboxylic acids which contain sulfonic acid groups, for example, salts of p-sulfonic benzoic acid, may be obtained as principal products of the process of this invention. The free acids or their derivatives, such as their chlorides or esters, may be obtained from the product salts by well known methods.

Aromatic sulfonic acids, the salts of which may be used as starting materials for the reaction of this invention are, for example, mono- or polysulfonic acids of benzene, naphthalene, diphenyl and other aromatic compounds. The aromatic ring system may, in addition to the sulfonic acid radical, also contain other substituents, especially hydrocarbon radicals, alkoxy groups, halogen atoms and others, provided such substituents do not effect a decomposition of the molecule under the prevailing reaction conditions. Typical examples of the class of compounds which may be used as starting materials for the process of this invention are benzene sulfonic acid, toluene sulfonic acids, $\alpha$- and $\beta$-naphthalene sulfonic acids, isomeric methyl-naphthalene sulfonic acids, m-benzene disulfonic acids, various naphthalene disulfonic acids or mixtures thereof, diphenylsulfone sulfonic acids and the like.

The above-mentioned aromatic sulfonic acids are used in the process of the invention in the form of their salts, especially their alkali metal or alkaline earth metal salts. The use of the potassium salts or mixtures of the potassium and sodium salts has been found to be especially advantageous. The cesium, rubidium and lithium salts may be used but are too expensive for most commercial uses of the process. The above starting materials are heated in the presence of carbon dioxide, which may be provided in combined form. Thus, the salts of the aromatic sulfonic acids may, for example, be heated in the presence of carbonates, especially of alkali metal carbonates. Especially good yields are obtained if potassium carbonate is used. It is advantageous to heat the starting materials in the presence of gaseous carbon dioxide under pressure; in many cases an improvement of the yield is achieved by an increase of the pressure. The carbon dioxide may be diluted with other inert gases, for example, with nitrogen.

The carbonates of the alkali metals, especially potassium carbonate, are advantageously used as acid-binding compounds for the process of this invention. However, the carbonates of magnesium, calcium, aluminum and other metals are also suitable. In place of the carbonates of these metals, their oxides, hydroxides, bicarbonates or oxalates may also be used. The starting materials should be as anhydrous as possible. It is further advantageous to carry out the reaction according to the present invention in the absence of oxygen.

The reaction of the invention takes place at elevated temperatures, generally above 200° C. The upper temperature limit is determined only by the decomposition temperature of the organic substance, which in most cases lies above 500° C. The optimum reaction temperature is different for the individual starting materials and in most instances lies between 300° C. and 450° C. In many cases the yields of sulfonic carboxylic acids increase at low reaction temperatures, while at higher temperatures larger amounts of carboxylic acids free from sulfonic groups, especially dicarboxylic acids, are obtained.

It has further been found that the reaction is favorably influenced by the presence of catalysts. Heavy metals and their compounds, such as zinc, cadmium, lead, mercury, iron, bismuth or thallium, have an especially favorable effect. The metals may also be used in the form of their oxides or their salts formed with inorganic or organic acids. The presence of the metal radical and not the form in which it is combined appears to produce the catalytic effect.

In addition to the catalysts, inert filler materials, such as sand, finely divided carbon, kieselguhr, bentonite, powdered metal or metal shavings, and also inert salts, such as sodium sulfate, potassium sulfate and the like, may be added to the reaction mixture. These filler materials are added to the reaction mixture especially in those cases where the reaction mixture tends to cake. Raw sulfonation mixtures which have been admixed with an excess of carbonate and have been dried by well known methods, for example, by spray-drying, are used as starting materials in this invention. Also organic solvents or diluents, such as benzene, toluene, xylene, high-boiling-point benzines and the like, may be added to the reaction mixture.

The reaction mixture may be worked up in any suitable manner. It may, for example, be dissolved in water and thereafter be freed from undesirable components by filtration in the presence of activated charcoal or other purifying agents if desired. The carboxylic acids formed by the reaction may be precipitated and separated from the aqueous solutions by acidification thereof or by extraction with a solvent. The acidification may be effected, for example, with hydrochloric acid, sulfuric acid or other strong acids. It is also advantageous to carry out the acidification with carbon dioxide; this method makes it possible to separate the terephthalic acid in the form of its potassium salt. The remaining mixture may then be evaporated and again be recycled into the reaction.

The aromatic sulfonic carboxylic acids which are more readily soluble in water than the carboxylic acids may be extracted from the aqueous solution, for example, by extraction with an organic solvent, after the acidification of the aqueous solution with the strong acid. Their salts may also be isolated by salting out, possibly after concentrating the aqueous solution. Similarly, they may be precipitated in the form of their calcium or barium salts.

The process according to the present invention makes it possible to produce aromatic carboxylic acids, especially terephthalic acid, or aromatic sulfonic carboxylic acids, such as p-sulfonic benzoic acid from aromatic sulfonic acids which are very readily accessible. Thus, a new possibility for the production of aromatic carboxylic acids or sulfonic carboxylic acids from aromatic hydrocarbons and sulfonic acids is provided.

The following examples are set forth to enable persons skilled in the art to understand and practice our invention and are not intended to be limitative.

*Example I*

A mixture of 24.5 gm. dry benzene potassium sulfonate, 5.5 gm. of the double salt $K_2CdCl_2F_2$ and 70 gm. anhydrous potassium carbonate was placed into a rotary autoclave having a volume of 250 cc. Subsequently, carbon dioxide was introduced until the internal pressure reached 50 atmospheres and the autoclave and its contents were heated for 5 hours at 400° C. A pressure of 170 atmospheres developed. After cooling and releasing the pressure from the autoclave, the reaction product was dissolved in 500 cc. water and the solution was filtered. The filtrate was acidified with hydrochloric acid, allowed to stand for a short period of time and was then subjected to suction filtration while still hot. 1.1 gm. terephthalic acid were obtained. By extraction of the filtrate with ether, 2.5 gm. p-sulfonicbenzoic acid were isolated.

*Example II*

A mixture of 24.5 gm. benzene potassium sulfonate, 70 gm. anhydrous potassium carbonate and 5 gm. cadmium fluoride was placed into an autoclave having a volume of 0.2 liter. Subsequently, the autoclave was evacuated and about 50 gm. liquid carbon dioxide were introduced. The contents of the autoclave were then heated for 9 hours at 360° C., whereby a pressure of about 300 atmospheres developed. After cooling and releasing the pressure from the autoclave, the reaction product was dissolved in water. The solution was filtered and acidified with hydrochloric acid while hot. 3.1 gm. terephthalic acid crystallized out, which were filtered off while hot. By shaking the mother liquor with ether, a mixture consisting of 3.5 gm. p-sulfonic-benzoic acid and 1.3 gm. terephthalic acid was obtained.

*Example III*

A mixture of 24.5 gm. dry benzene potassium sulfonate, 5 gm. cadmium fluoride and 70 gm. anhydrous potassium carbonate was placed into a rotary autoclave having a volume of 250 cc. 70 gm. liquid carbon dioxide were added to this mixture and thereafter the autoclave was heated for 16 hours at 360° C. A pressure of about 300 atmospheres developed. The reaction product was worked up in the manner described in Example I. 9.2 gm. terephthalic acid and 1.2 gm. p-sulfonic-benzoic acid were obtained.

*Example IV*

23.7 gm. benzene potassium sulfonate was finely milled in a ball mill together with 95.0 gm. anhydrous potassium carbonate and the resulting mixture was placed into an autoclave having a volume of 250 cc. 70 gm. carbon dioxide were added to this mixture and the autoclave was heated for 16 hours at 360° C. A pressure of 300 atmospheres developed. The reaction product was worked up in the manner described in the preceding examples and yielded 0.6 gm. terephthalic acid and 1.2 gm. p-sulfonic-benzoic acid.

While we have set forth specific embodiments and preferred modes of practice of our invention, it will be understood that the invention is not limited thereby and that various modifications may be made without departing from the spirit of the disclosure and the scope of the following claims.

We claim:

1. A process for the production of aromatic carboxylic acids selected from the group consisting of aromatic dicarboxylic and sulfonic carboxylic acids which comprises the steps of heating alkali metal salts of aromatic sulfonic acids in an inert atmosphere containing carbon dioxide, in the presence of an acid binding agent, to a temperature of at least 200° C. but not higher than the temperature at which the starting materials and reaction products will substantially decompose, and thereafter acidifying the reaction mixture to separate said aromatic acid products.

2. A process for the production of aromatic dicarboxylic acids which comprises the steps of heating alkali metal salts of aromatic sulfonic acids in an inert atmosphere containing carbon dioxide at elevated pressures, in the presence of an acid binding agent, to a temperature of at least 200° C. but not higher than the temperature at which the starting materials and reaction products will substantially decompose, and thereafter acidifying the reaction mixture to separate the aromatic dicarboxylic acid products.

3. A process for the production of aromatic dicarboxylic acids which comprises the steps of heating alkali metal salts of aromatic sulfonic acids in an atmosphere of carbon dioxide, in the presence of an acid binding agent, to a temperature of at least 200° C. but not higher than the temperature at which the starting materials and reaction products will substantially decompose, and thereafter acidifying the reaction mixture to separate the aromatic dicarboxylic acid products.

4. The process of claim 3 wherein the alkali metal is selected from the group consisting of potassium and sodium.

5. A process for the production of aromatic dicarboxylic acids which comprises the steps of heating salts of aromatic sulfonic acids in an atmosphere of carbon dioxide, in the presence of an alkali metal carbonate as an acid binding agent, to a temperature of at least 200° C. but not higher than the temperature at which the starting materials and reaction products will substantially decompose, and thereafter acidifying the reaction mixture to separate the aromatic dicarboxylic acid products.

6. The process of claim 5 wherein the alkali metal carbonate is potassium carbonate.

7. A process for the production of aromatic dicarboxylic acids which comprises the steps of heating salts of aromatic sulfonic acids in an atmosphere of carbon dioxide, in the presence of an acid binding agent and in the presence of a catalyst containing a metal radical selected from the group consisting of zinc, cadmium, mercury, iron, lead, bismuth and thallium, to a temperature of at least 200° C. but not higher than the temperature at which the starting materials and products will substantially decompose, and thereafter acidifying the reaction mixture to separate the aromatic dicarboxylic acid products.

8. A process for the production of aromatic carboxylic acids which comprises the steps of heating salts of aromatic sulfonic acids in an atmosphere of carbon dioxide, in the presence of an acid binding agent, to a temperature of at least 200° C. but not higher than the temperature at which the starting materials and products will substantially decompose, and thereafter acidifying the reaction mixture to separate the aromatic carboxylic acid products.

9. A process for the production of terephthalic acid which comprises the steps of heating alkali metal salts of benzene sulfonic acids having the sulfonic groups in other than the para-position, in an atmosphere of carbon dioxide, in the presence of acid binding agents, at a temperature of at least 200° C. and not greater than the temperature at which the starting materials and products will substantially decompose, and thereafter acidifying the reaction mixture to separate the terephthalic acid.

10. A process for the production of terephthalic acid which comprises the steps of heating alkali metal salts of benzene sulfonic acids having the sulfonic groups in other than the para-position, in an atmosphere of carbon dioxide, in the presence of acid binding agents and in the presence of a catalyst comprising a metal from the group consisting of zinc, cadmium, mercury, iron, lead, bismuth and thallium, at a temperature of at least 200° C. and not greater than the temperature at which the starting materials and products will substantially decompose, and thereafter acidifying the reaction mixture to separate the terephthalic acid.

11. A process for the production of para-sulfonic-benzoic acid which comprises the steps of heating alkali metal salts of benzene sulfonic acids having the sulfonic groups in other than the para-position, in an atmosphere of carbon dioxide, in the presence of acid binding agents, at a temperature of at least 200° C. and not greater than the temperature at which the starting materials and reaction products will substantially decompose, and thereafter acidifying the reaction mixture to separate the para-sulfonic-benzoic acid products.

12. A process for the production of para-sulfonic-benzoic acid which comprises the steps of heating alkali metal salts of benzene sulfonic acids having the sulfonic groups in other than the para-position, in an atmosphere of carbon dioxide, in the presence of acid binding agents, and in the presence of a catalyst containing a metal radical selected from the group consisting of zinc, cadmium, mercury, iron, lead, bismuth and thallium, at a temperature of at least 200° C. and not greater than the temperature at which the starting materials and reaction products will substantially decompose, and thereafter acidifying the reaction mixture to separate the para-sulfonic-benzoic acid product.

No references cited.